US000001151H

United States Statutory Invention Registration [19]

[11] Reg. Number: H1151

Peterson, Jr.

[43] Published: Mar. 2, 1993

[54] FOLDED CAVITY ANTENNA

[76] Inventor: Edward A. Peterson, Jr., 1022 Kitchener Cir., San Jose, Calif. 95121

[21] Appl. No.: 672,268

[22] Filed: Mar. 20, 1991

[51] Int. Cl.[5] ..... H01Q 13/10; H01Q 13/22

[52] U.S. Cl. ..... 343/705; 343/708; 343/767; 343/789

[58] Field of Search ..... 343/705, 708, 767, 771, 343/789

[56] References Cited

U.S. PATENT DOCUMENTS

| | | | |
|---|---|---|---|
| Re. 29,296 | 7/1977 | Krutsinger et al. | 343/700 MS |
| 3,074,063 | 1/1963 | Hurton | 343/708 |
| 3,172,112 | 3/1965 | Seeley | 343/767 |
| 3,346,865 | 10/1967 | Jones | 343/771 |
| 3,509,571 | 4/1970 | Jones et al. | 343/708 |
| 3,518,685 | 7/1970 | Jones | 343/708 |
| 3,810,183 | 5/1974 | Krutsinger et al. | 343/708 |
| 3,987,453 | 10/1976 | Lopez | 343/767 |
| 3,987,454 | 10/1976 | Epis | 343/771 |
| 4,197,545 | 4/1980 | Favaloro et al. | 343/700 MS |
| 4,367,475 | 1/1983 | Schiavone | 343/767 |
| 4,373,162 | 2/1983 | Peterson | 343/771 |
| 4,460,894 | 7/1984 | Robin et al. | 343/700 MS |

*Primary Examiner*—Bernarr E. Gregory

[57] ABSTRACT

An antenna which conforms to the surface of a spacecraft can be a thin slot antenna which can be formed to the shape of the craft in combination with a compact ground plane formed of T-shaped or L-shaped pieces.

3 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FOLDED CAVITY ANTENNA

FIELD OF THE INVENTION

This invention pertains to a microwave antenna, and in particular to a compact antenna which can be made to conform to a cylindrical body in a spacecraft.

BACKGROUND OF THE INVENTION

Antennas in a spacecraft are used to telemeter information on spacecraft operation to a ground station. Although external antennas can be used in outer space, only antennas integral with the skin of the spacecraft are usable during launch and re-entry. It then becomes a problem of some technical difficulty to design efficient antennas for useful frequencies which are light and not protruding from the spacecraft.

U.S. Pat. No. 3,172,112 to Seeley discloses a dumbell-loaded folded slot antenna. U.S. Pat. No. 3,346,865 to Jones discloses a simple slot antenna built into a dielectric radome. U.S. Pat. No. 3,518,685 to Jones discloses a dielectric-loaded simple cavity antenna in a ballistic projectile. U.S. Pat. No. 3,987,453 to Lopez discloses a balanced exciter for a wideband antenna element. U.S. Pat. No 4,197,545 to Favaloro et al discloses a stripline slot antenna adapted for use on aircraft or other vehicles. U.S. Pat. No. 4,367,475 to Schiavone discloses a linearly polarized radiating slot antenna. U.S. Pat. No. 4,373,162 to Peterson discloses a low frequency electronically steerable cylindrical slot array radar antenna. U.S. Pat. No. 4,460,894 to Robin et al discloses a laterally isolated microstrip antenna. U.S. Pat. No. Re. 29,296 to Krutsinger et al discloses a dual slot microstrip antenna device. All of the above relate the same general area of technology, and all are different because choices of frequencies, size of the vehicle and environmental conditions make unique problems requiring different solutions.

A discrete antenna of a given size may have a beamwidth that results in less than optimal coverage in a two antenna system on a cylindrical groundplane. Also a cavity antenna has an aperture that is too large to fit into a gap 2 inches wide.

A slot type antenna requires a ground plane of certain minimal size to radiate effectively. The minimum size required is an inverse function of frequency, making it difficult to accommodate the required ground plane in low frequency antennas. A slot antenna operating at ultra-high frequencies (UHF) would usually require a conducting ground plane 9 inches on either side of the slot.

OBJECTIVES OF THE INVENTION

It is therefore a primary objective of the present invention to provide maximum spherical coverage of a discrete than antenna system formed on a cylindrical body.

SUMMARY OF THE INVENTION

This objective of the invention and other objectives, features and advantages to become apparent as the specification progresses are accomplished by the invention according to which, briefly stated, a thin slot antenna which can be formed to the shape of the craft operates at UHF frequencies in combination with a compact ground plane formed of T-shaped or L-shaped pieces.

List of Advantages of the Invention

An important advantage of the present invention is that beamwidth and frequency can be adjusted independently of antenna cavity size.

A further advantage is that the antenna of the invention can be made very thin, approximately 0.4 inches, for an antenna operating at UHF frequencies.

Another advantage is that the antenna can be shaped to conform to the curvature of the skin of a vehicle.

Still another advantage is that use of air dielectric eliminates the need for tightly controlled dielectric material.

A still further advantage is that T-shaped or L-shaped groundplane sections reduce the size of the groundplane needed to operate a slot antenna.

These and further objectives, constructional and operational characteristics, and advantages of the invention will no doubt be more evident to those skilled in the art from the detailed description given hereinafter with reference to the figures of the accompanying drawings which illustrate a preferred embodiment by way of non-limiting example.

BRIEF DESCRIPTION OF THE DRAWINGS

FIG. 6 is a plan view of the T-shaped ground planes.

FIG. 7 is a plan view of the L-shaped ground planes.

GLOSSARY

Figure 1:
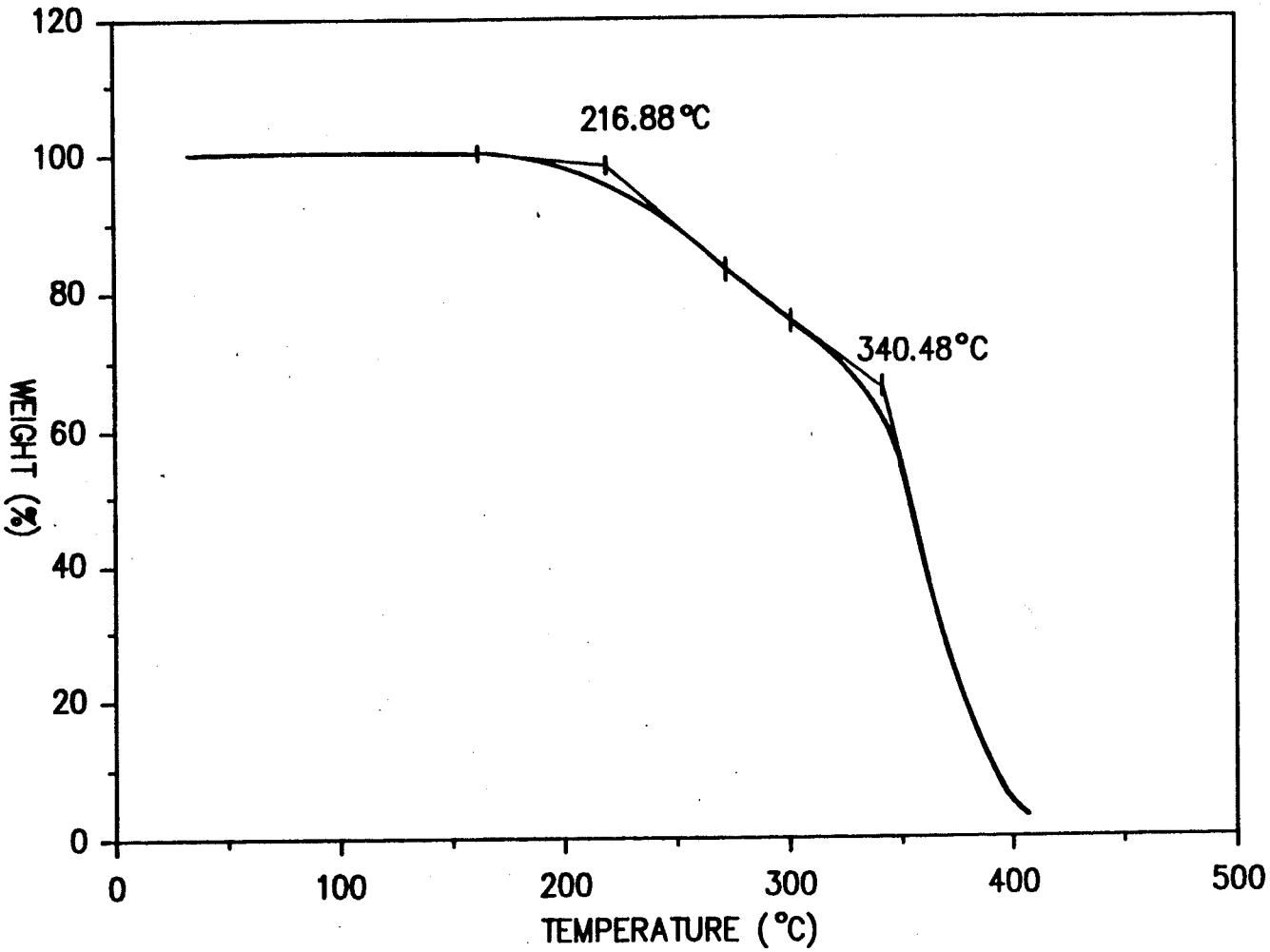
FIG. 1 shows a plan view of the antenna of the invention.
Figure 2:
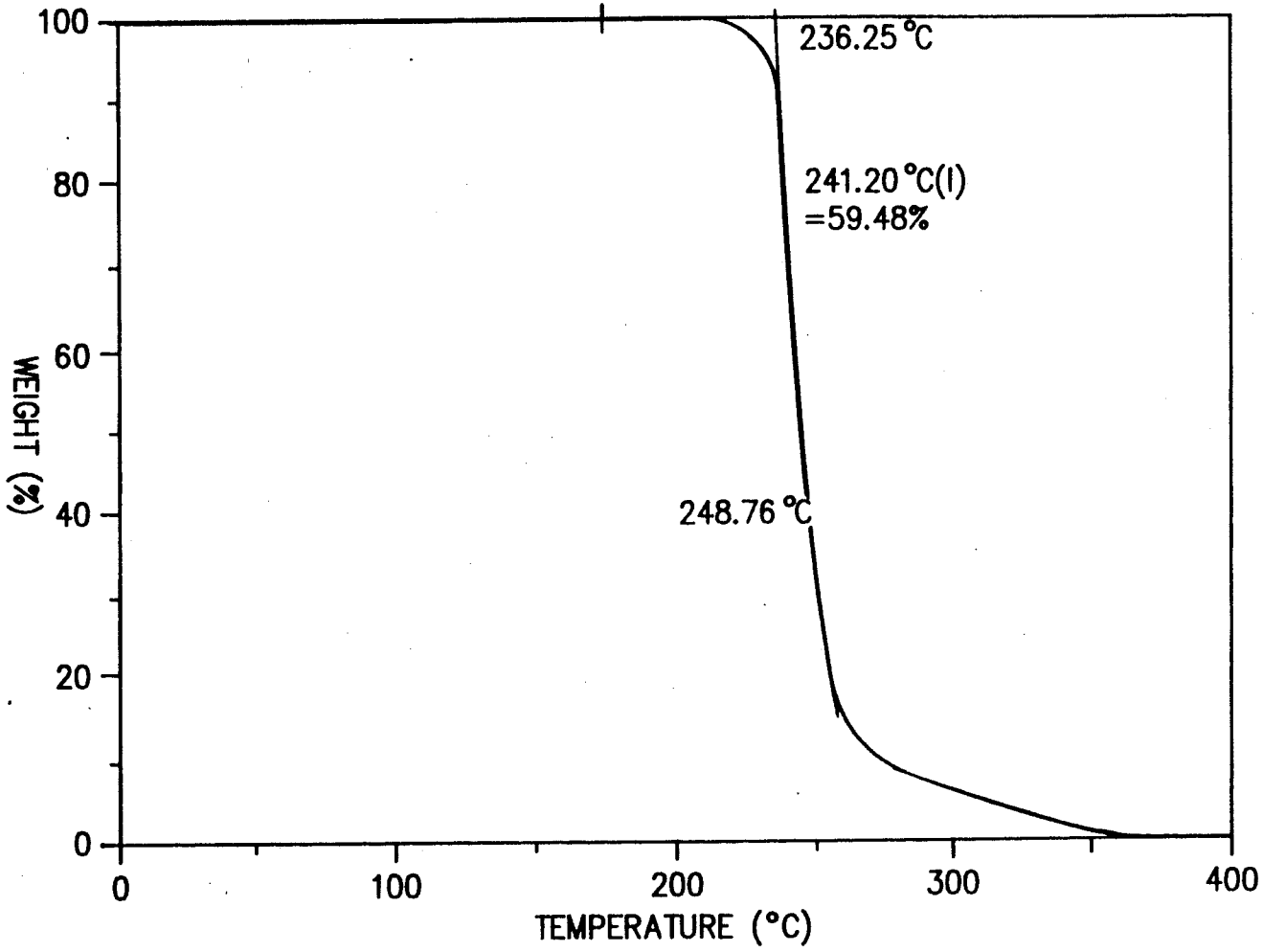
FIG. 2 shows an end view of the antenna of FIG. 1.
Figure 3:
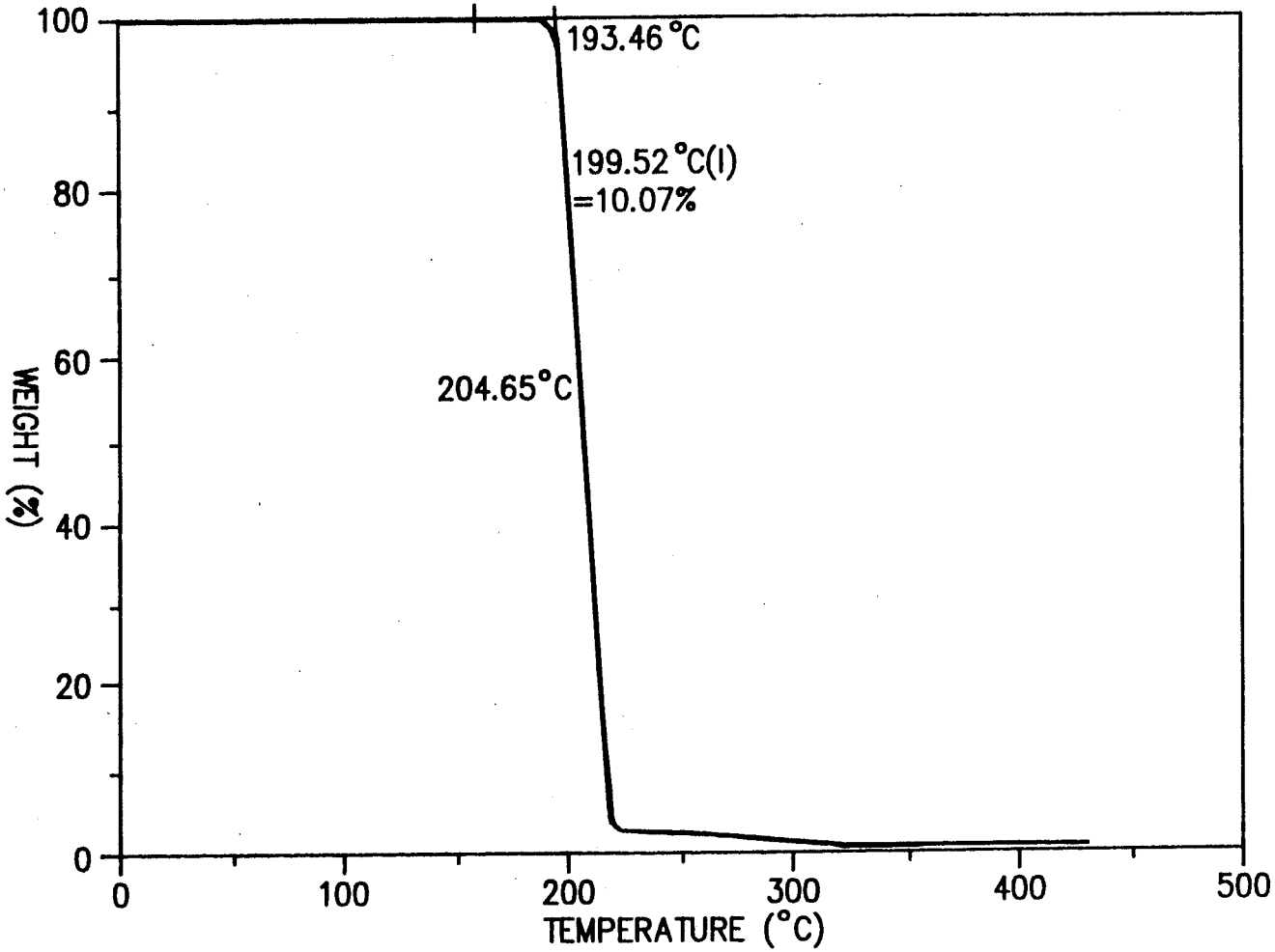
FIG. 3 shows a detailed view of the slot of the antenna of FIG. 1.

The following is a glossary of elements and structural members as referenced and employed in the present invention.

11—antenna
13—upper copper-clad surface
15—lower copper-clad surface
17—slot aperture
19—honeycomb core
21, 23—Kevlar facesheets
25, 27, 29, 31—copper-clad edges
33—coaxial connector
35, 37—u-shaped elements
39—slot
41, 44—T-structures of a compact ground plane
45, 46—L-structures of a compact ground plane

DESCRIPTION OF THE PREFERRED EMBODIMENTS

Figure 4:
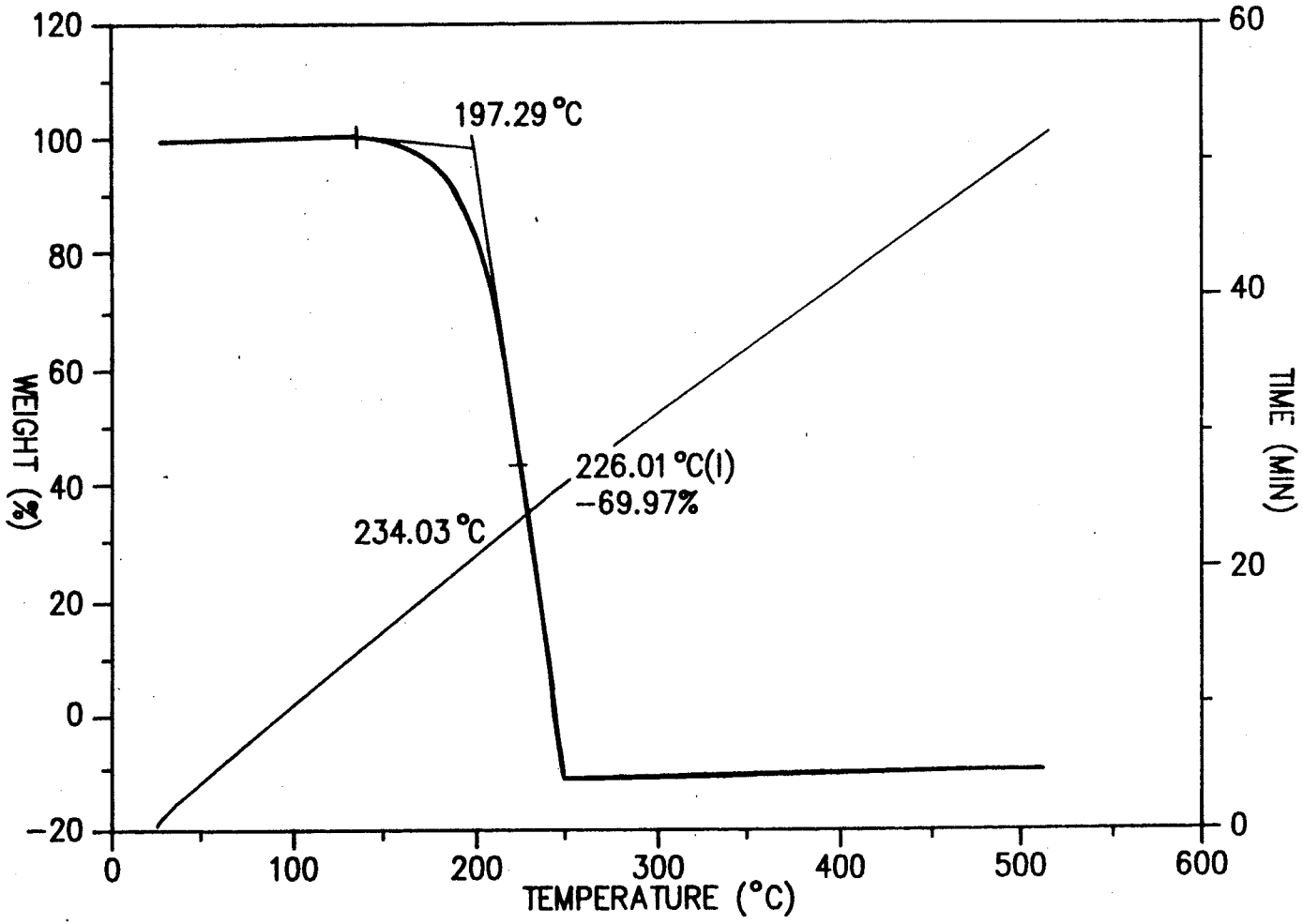
FIG. 4 is a sectional view along the section line 4—4 in FIG. 1.
Figure 5A:
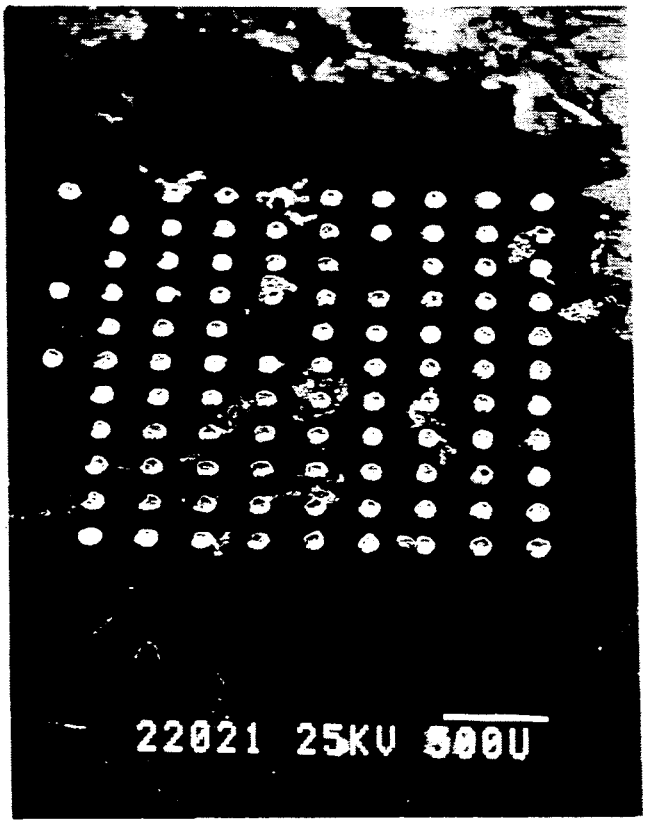
FIG. 5 is a sectional view along the section line 5—5 in FIG. 1.
Figure 5B:
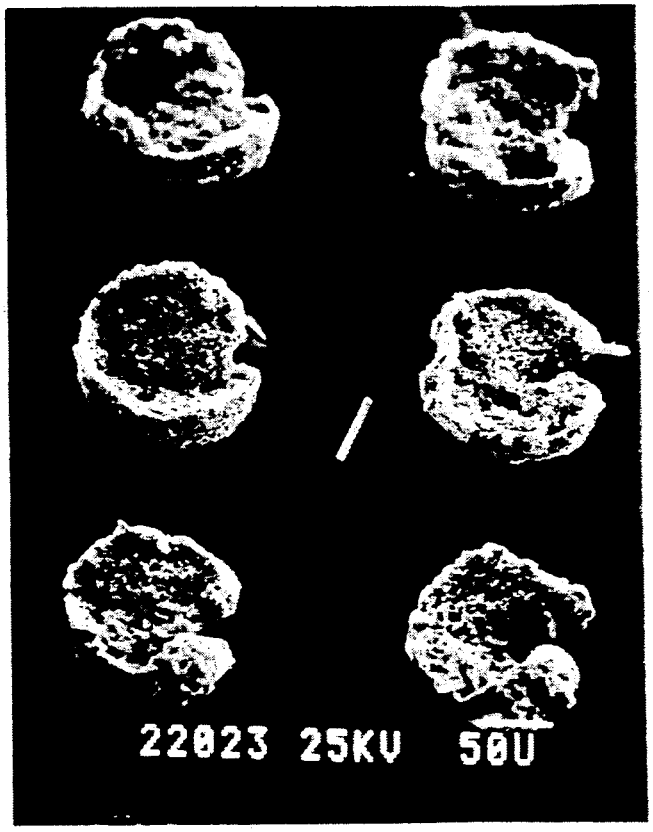
Figure 5C:
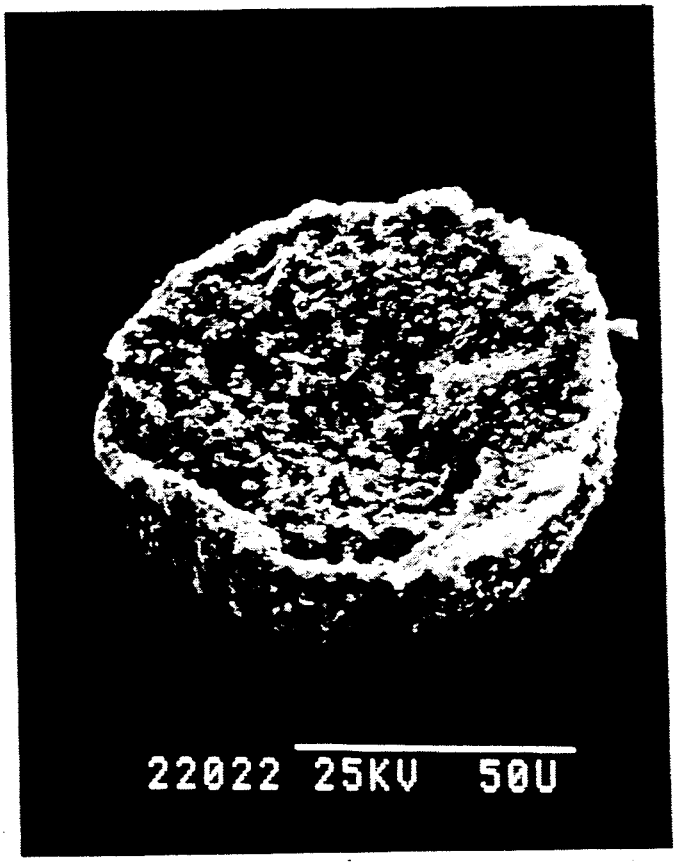

Referring now to the drawings wherein like reference numerals are used to designate like or corresponding parts throughout the various figures thereof, there is shown in FIGS. 1 through 5 an antenna 11 consisting of upper copper-clad surface 13, lower copper-clad surface 15, and a slot aperture 17. The overall dimensions of the antenna are about 0.29λ in width, and 0.63λ in length, where λ is the free-space wavelength at the desired operating frequency. The aperture 17 has the configuration and dimensions shown in FIG. 3, and is etched completely through the upper copper-clad surface 13. The internal structure of the antenna 11 is shown in FIG. 4, and includes a phenolic honeycomb core 19, two Kevlar facesheets 21 and 23, copper-clad edges 25, 27, 29 and 31. Materials other than phenolic honeycomb and Kevlar may be used. The honeycomb may be replaced by any low-loss, low dielectric spacer, such as polystyrene foam. The Kevlar facesheets are structural and may be replaced by a low-loss, moderate dielectric material, such as Kapton, Delrin or Teflon-glass. The outer conductor of a coaxial connector 33 is connector to lower copper-clad surface 15; the center conductor of the coaxial connector is connected to upper copper-clad surface 13. The shape of the aperture 17 is unique and comprises u-shaped elements 35, 37 that are interconnected by slot 39. This aperture radiates in an outward direction normal to outer copper-clad layer 13 and is shielded from radiating inwardly by lower copper-clad surface 15. A major advantage of this antenna is that it may be tuned to particular frequencies by changing only the aperture dimensions, primarily the mension "L" in FIG. 3, and leaving the overall antenna dimensions unchanged.

In FIG. 6, there is shown a slot-type antenna 11 used with a compact ground plane consisting of a conductive material such as copper or aluminum shaped into two T-structures 41, 44. The T-structures 41, 44 are centered over slot aperture 17. The branches of the T-structures 41, 44 are separated by no more than 0.04λ from the edge of the slot antenna 11. The overall protrusion of the compact ground plane beyond the edge of the slot antenna 11 is no more than 0.08λ. The width of the branches of the T-structure 41, 44 are no more than 0.04λ. The length, L, of the T-structure is approximately 0.3λ and can be adjusted for optimal performance at a particular frequency.

If space restriction requires, part of the T-structures 41,44 may be eliminated resulting in L-structures 45, 46 shown in FIG. 7. The resulting L-structure 45, 46 will operate with only minimal degradation compared to the T-structures 41, 44.

A major advantage of the compact ground plane is that it permits the integration of a low frequency antenna in a complex structure without interfering with that structure.

This invention is not limited to the preferred embodiment and alternatives heretofore described, to which variations and improvements may be made, without departing from the scope of protection of the present patent and true spirit of the invention, the characteristics of which are summarized in the following claims.

What is claimed is:

1. An antenna for use in the very-high and ultra-high frequency bands, comprising:

a first surface of conductive material, a second surface of conductive material equally spaced from said first surface and closer to a cylindrical axis of symmetry, edges of conductive material connecting outer perimeters of said first and second surface, and a slot means for radiating cut into said first surface.

2. The antenna of claim 1 including a compact ground plane formed of two T-shaped structures.

3. The antenna of claim 1 including a compact ground plane formed of two L-shaped structures.

* * * * *